UNITED STATES PATENT OFFICE.

HARRY P. BASSETT, OF CYNTHIANA, KENTUCKY.

PROCESS OF TREATING DISTILLER'S SLOP.

1,344,851. Specification of Letters Patent. Patented June 29, 1920.

No Drawing. Application filed July 12, 1919. Serial No. 310,438.

*To all whom it may concern:*

Be it known that I, HARRY P. BASSETT, a citizen of the United States, residing at Cynthiana, in the county of Harrison and State of Kentucky, have invented certain new and useful Improvements in Processes of Treating Distillers' Slops, of which the following is a specification.

This invention relates to processes of treating distillers' slops and has particular reference to a process of treating such slops to recover the glycerin content thereof and to permit of the production and recovery of volatile fatty acids, such as formic and acetic acids, and the separation and recovery of the greater part or all of the potassium content of the slops.

Distillers' slops and particularly the slops resulting from the production and separation of alcohol from black strap molasses, contain in addition to ordinary and invert sugars, other carbohydrates such as unfermentable sugars (raffinose and the like), starches and gums, and the presence of these carbohydrates or certain of them, has hitherto prevented the satisfactory economical separation of glycerin from distillers' slops.

Now, I have discovered that the carbohydrates present in distillers' slops, including the unfermentable sugars, starches and gums, can be decomposed with the production of organic compounds which do not interfere with the satisfactory separation of the glycerin, that certain of the organic compounds produced in the operation of the process can be wholly or in part separated from the treated slops, and the glycerin readily and economically recovered from the residue.

In the preferred practice of my process, distillers' slops, preferably slops resulting from the treatment of black strap molasses, are treated with an alkaline earth metal hydroxid, preferably calcium hydrate in the form of milk of lime and in the preferred proportions of from 6 to 30 parts by weight of such hydroxid to 100 parts by weight of the slops.

The quantity of the alkaline earth metal hydroxid employed may be varied within wide limits, the greater amount of the hydroxid added, the more rapid the reaction and the lower the temperature at which the reaction occurs. By adding 6 per cent. by weight of lime and boiling for from twenty to thirty minutes, satisfactory results may be obtained, while by adding 30 per cent. by weight of lime, the reaction takes place far more rapidly and can be carried out even at ordinary atmospheric temperatures.

It is inconvenient and accordingly disadvantageous in the practice of my process to add a very large quantity of lime and I prefer to employ about 12 per cent. by weight of lime in which case I have found it advantageous to add a charge of 6 per cent. of lime, to boil vigorously for about twenty minutes, to filter off the excess of lime and to add a second charge of 6 per cent. by weight of lime and to repeat the operation.

I may advantageously heat the slop and lime under superatmospheric pressure, preferably a pressure of 80 pounds per square inch, in which case I employ not to exceed 6 per cent. by weight of lime and may use less, and the treatment is continued for a shorter period, ordinarily from five to ten minutes. It is to be understood that the proportion of the hydroxid used and the temperature, pressure and duration of the treatment are matters chiefly determined from considerations of economy and ease of manipulation of the process.

After the treatment of the slops with the alkaline earth metal hydroxid, the solid matter in the treated slops, which consists principally of uncombined and undissolved lime, is separated, preferably by filtration.

The resulting liquor which is of a deep wine color, contains the ingredients of the original slops with, however, the carbohydrates originally present therein decomposed into salts of the hydroxy-acids of the lactic acid series. To this liquor, I add sufficient acid to effect the neutralization of the solution and to produce an acid condition therein. A sufficient degree of acidity is obtained by adding one-half of 1 per cent. by weight of a mineral acid in excess of the amount of acid necessary to neutralize the solution. In the practice of my process, I ordinarily add from 1 to 1½ per cent. by weight of a mineral acid and I prefer to employ sulfuric acid, although other acids or acid salts may be used, as will be readily understood by those skilled in the art. A materially greater amount of acid than that indicated may be employed but as the acidity of the solution is later overcome, an unnecessary excess of acid is disadvantageous.

Upon the addition of the acid, the solution becomes slightly lighter in color but the change in color is not pronounced.

Upon the acidification of the solution, the hydroxyacids of the lactic acid series are decomposed with the formation of aldehydes and acids of the volatile fatty acid series, such for example, as acetic aldehyde, propionic aldehyde, formic acid, acetic acid, propionic acid, etc.

Of these organic compounds, formic acid and acetic acid are present in considerable amounts and a substantial quantity of these acids may be advantageously separated from the slops by distillation. In practice, I prefer to continue the distillation until the liquor is evaporated to about the salting point. The formic and acetic acids which distil over may be separated and freed from other organic compounds in the distillate in any desired manner as by fractional distillation.

The residue in the still is then subjected to the action of a solution of a salt of a metal adapted to form an insoluble basic salt with acids of the volatile fatty acid series and in practice, I employ an iron or aluminum salt, such for example, as ferrous sulfate, ferric sulfate, or aluminum sulfate. I prefer to add one or more of these salts in the proportions of from about 2 to 4 parts by weight to 100 parts by weight of the liquor.

In my experiments, I have obtained the most satisfactory results by the employment of about 2½ per cent. of a mixture of equal parts of ferrous sulfate and ferric sulfate.

Upon the addition of the iron salt or salts, the color of the solution becomes a deep black.

The solution with the added iron salt, is then heated to boiling for preferably from ten to twenty minutes. This heating, if desired, may be conducted under superatmospheric pressure, preferably 60 pounds per square inch, in which case the duration of the treatment may be shortened preferably to from five to ten minutes.

The treatment of the liquor with the iron or aluminum salt results in the production of the formate, acetate, propionate, etc., of the metal employed.

I then overcome the acidity of the solution and preferably render it noticeably alkaline by the addition of a basic compound of an alkali or alkaline earth metal and in practice I prefer to use about 6 per cent. by weight of an alkaline earth metal hydroxid, preferably lime in the form of milk of lime. This transforms the iron or aluminum formate, acetate, propionate, etc., into corresponding basic salts which are insoluble in the solution and which readily precipitate together with the excess of iron and lime present, leaving the solution a light lemon-yellow color.

The mixture is then filtered and the resulting solution without further treatment may be evaporated to separate out the greater part of the potash salts which are present and which, if sulfuric acid has been used to acidify the solution, are recovered as potassium sulfate. The evaporation is preferably continued until about ⅔ of the potassium salts present are precipitated. I then separate the liquid from the precipitated salts by decantation or otherwise. The decanted liquid contains a material proportion, usually as high as 50 per cent. of glycerin. I separate the glycerin from the remaining solution by distillation in the presence of steam. All of the glycerin may be distilled over, but I have found it advantageous in practice, to distil over only about from 90 to 95 per cent. of it and to add the residue in the still, to a new batch of distillers' slops.

Glycerin obtained as described is of a light straw color but if it is desired to obtain glycerin which is water-white, the solution obtained after the separation of the organic iron salts may be filtered through bone black which effectively decolorizes it.

While I have described in detail the preferred practice of my process, it is to be understood that the proportions of reagents employed and the details of procedure may be varied and that known chemical equivalents of the reagents used may be employed, all without departure from the spirit of my invention or the scope of the subjoined claims.

While I prefer to employ a ferrous or ferric salt such as the sulfate or a mixture of the two, it is to be understood that aluminum salts may be used and are to be considered as equivalents of the iron salts for use in my process.

The present process is broadly claimed in my application Serial No. 310437, filed July 12, 1919.

Having thus described my invention, I claim:

1. A process of treating distillers' slops comprising subjecting them to the action of an alkaline earth metal hydroxid, then to the action of an acid, removing formic and acetic acids from the treated liquor, adding a salt of a metal adapted to form an insoluble basic salt with acids of the volatile fatty acid series, overcoming the acidity of the treated liquor and separating glycerin therefrom.

2. A process of treating distillers' slops, comprising subjecting them to the action of an alkaline earth metal hydroxid, then acidifying the liquid, removing formic and acetic acids from the treated liquor, adding thereto a salt of a metal adapted to form an insoluble basic salt with acids of the volatile fatty acid series, then rendering the liquor alkaline and separating glycerin therefrom.

3. A process of treating distillers' slops comprising subjecting them to the action of an alkaline earth metal hydroxid, and to the action of an acid, distilling off formic and acetic acids produced, adding an iron salt, then rendering the treated liquor alkaline and separating glycerin therefrom.

4. A process of treating distillers' slops comprising subjecting them to the action of calcium hydroxid, then to the action of an acid, distilling off formic and acetic acids produced, adding an iron salt, then rendering the treated liquor alkaline and separating glycerin therefrom.

5. A process of treating distillers' slops comprising adding a sufficient amount of a basic compound of an alkaline earth metal to give them an alkaline reaction, then adding sufficient acid to give the slops an acid reaction, removing formic and acetic acids produced, concentrating the liquor, adding a salt of a metal adapted to form an insoluble basic salt with acids of the volatile fatty acid series, then rendering the liquor alkaline and separating glycerin therefrom.

6. A process of treating distillers' slops comprising subjecting them to the action of from 6 to 30 parts by weight of an alkaline earth metal hydroxid to 100 parts by weight of the slops, adding sufficient acid to give the slops a distinctly acid reaction, removing formic and acetic acids produced, adding a salt of a metal adapted to form an insoluble basic salt with acids of the volatile fatty acid series, then adding a sufficient quantity of a base to give the treated liquor a distinctly alkaline reaction, and separating glycerin therefrom.

7. A process of treating distillers' slops comprising subjecting them to the action of an alkaline earth metal hydroxid, heating the mixture, separating the solid portion thereof, adding to the separated liquid portion a sufficient quantity of acid to give such solution a distinctly acid reaction, removing formic and acetic acids produced, adding a salt of a metal adapted to form an insoluble basic salt with acids of the volatile fatty acid series, heating the mixture, adding a sufficient quantity of a base to give the liquor an alkaline reaction, and separating glycerin from such liquor.

8. A process of treating distillers' slops comprising subjecting them to the action of an alkaline earth metal hydroxid, heating the mixture, separating the solid portion thereof and adding to the separated liquid portion a sufficient quantity of an acid to give the liquor a distinctly acid reaction, removing formic and acetic acids produced, adding a salt of a metal adapted to form an insoluble basic salt with acids of the volatile fatty acid series, rendering the liquor alkaline, evaporating the liquor to remove potash salts therefrom, and separating glycerin from the liquid residue.

9. A process of treating distillers' slops comprising subjecting them to the action of an alkaline earth metal hydroxid, separating the solid from the liquid portion of the mixture, subjecting the liquid portion to the action of an acid, removing formic and acetic acids produced, adding a salt of a metal adapted to form an insoluble basic salt with the acids of the volatile fatty acid series, rendering the liquor alkaline, removing the solid from the liquid portion of the resulting mixture, and separating glycerin therefrom.

10. A process of treating distillers' slops comprising subjecting them to the action of an alkaline earth metal hydroxid, separating the solid from the liquid portion of the mixture, subjecting the liquid portion to the action of an acid, removing formic and acetic acids produced, adding a salt of a metal adapted to form an insoluble basic salt with the acids of the volatile fatty acid series, rendering the liquor alkaline, removing the solid from the liquid portion of the resulting mixture, evaporating the solution to remove potash salts therefrom, and removing glycerin from the remaining liquid.

In testimony whereof I affix my signature in presence of two witnesses.

HARRY P. BASSETT.

Witnesses:
  MARY F. LYONS,
  CURTIS C. MEIGS.